United States Patent
Li et al.

(10) Patent No.: US 11,426,719 B2
(45) Date of Patent: Aug. 30, 2022

(54) PREPARATION METHOD OF CATALYST WITH WHITE CARBON BLACK MODIFIED BY ZR—ND—O

(71) Applicant: Kunming University of Science and Technology, Kunming (CN)

(72) Inventors: Kai Li, Kunming (CN); Yingwu Wang, Kunming (CN); Ping Ning, Kunming (CN); Qiang Lin, Kunming (CN); Xin Sun, Kunming (CN); Chi Wang, Kunming (CN); Xin Song, Kunming (CN); Xiao Chen, Kunming (CN)

(73) Assignee: KUNMING UNIVERSITY OF SCIENCE AND TECHNOLOGY, Kunming (CN)

(*) Notice: Subject to any disclaimer, the term of this patent is extended or adjusted under 35 U.S.C. 154(b) by 281 days.

(21) Appl. No.: 16/736,616

(22) Filed: Jan. 7, 2020

(65) Prior Publication Data
US 2020/0222892 A1     Jul. 16, 2020

(30) Foreign Application Priority Data
Jan. 15, 2019    (CN) .......................... 201910036283.8

(51) Int. Cl.
| | | |
|---|---|---|
| *C08K 3/04* | (2006.01) | |
| *B01J 37/04* | (2006.01) | |
| *B01J 6/00* | (2006.01) | |
| *B01J 21/18* | (2006.01) | |
| *B01J 37/08* | (2006.01) | |
| *B01D 53/86* | (2006.01) | |
| *B01J 35/10* | (2006.01) | |

(52) U.S. Cl.
CPC ............ *B01J 37/04* (2013.01); *B01D 53/865* (2013.01); *B01J 6/001* (2013.01); *B01J 21/18* (2013.01); *B01J 35/1066* (2013.01); *B01J 37/08* (2013.01); *B01D 2256/24* (2013.01); *B01D 2257/553* (2013.01); *B01D 2257/556* (2013.01)

(58) Field of Classification Search
None
See application file for complete search history.

(56) References Cited

U.S. PATENT DOCUMENTS

| | | | | |
|---|---|---|---|---|
| 2004/0043897 A1* | 3/2004 | Tadao | ................ | B01D 53/9422 502/302 |
| 2012/0283459 A1* | 11/2012 | Kim | ........................ | B01J 23/06 554/167 |

* cited by examiner

*Primary Examiner* — Sheng H Davis
(74) *Attorney, Agent, or Firm* — Flener IP & Business Law; Zareefa B. Flener

(57) ABSTRACT

The present invention discloses a preparation method of a catalyst with white carbon black modified by Zr—Nd—O and use thereof, and belongs to the field of catalyst technologies. In the present invention, an organic solvent evaporation induced self-assembly method is used to load Zr—Nd—O onto white carbon black to obtain a mesoporous Zr—Nd—O/white carbon black catalyst. The mesoporous Zr—Nd—O/white carbon black catalyst in the present invention has high catalytic activity, contains uniformly distributed mesopores with a relatively large average aperture, and has a simple preparation process, etc.

8 Claims, 5 Drawing Sheets

PREPARATION METHOD OF CATALYST WITH WHITE CARBON BLACK MODIFIED BY ZR—ND—O

TECHNICAL FIELD

The present invention relates to a preparation method of a catalyst with white carbon black modified by Zr—Nd—O, and belongs to the field of catalyst technologies.

BACKGROUND

Acetylene gas, as a raw material used in the petrochemical industry, is used to prepare polyvinyl chloride (PVC), polybutadiene rubber, acetic acid, vinyl acetate, etc. As the PVC industry in China rapidly develops, there is an increasing demand for acetylene gas. At present, there are mainly two processes for production of acetylene gas: a wet process and a dry process. Compared with the dry process, the application of the wet process for production of acetylene gas is more common; however, the wet process has disadvantages of high water consumption, lower acetylene yield, and large production of carbide slag slurry, and is easy to cause groundwater and soil pollution. The dry production process can effectively overcome the disadvantages of the wet production process, and has obvious advantages in safety, economy, environmental protection, etc. Regardless of whether the dry process or the wet process is adopted, in addition to acetylene, crude acetylene also contains various impurity gas including hydrogen sulfide ($H_2S$), hydrogen phosphide ($PH_3$), arsenic hydride ($AsH_3$), ammonia gas ($NH_3$), and trace organic substances. Gas accounting for a larger content ratio in the impurity gas includes hydrogen sulfide and hydrogen phosphide gas. If not treated, the gas will cause catalyst poisoning in production of polyvinyl chloride, and also directly affect a yield of polyvinyl chloride. Moreover, the gas will pose a threat to the surrounding environment and people's physical and mental health. Therefore, it is quite necessary to purify crude acetylene gas. At present, there are mainly two methods for removal of hydrogen sulfide and hydrogen phosphide in acetylene gas: a wet process and a dry process. The wet process is widely used in purification of crude acetylene gas because of its advantages such as low price and easy operation and management. In the wet process, a large amount of wastewater is produced, which poses a threat to the environment. The dry process can effectively avoid wastewater production. However, at present, the dry process has relatively low impurity removal efficiency, and there is no efficient catalyst for simultaneously removing $PH_3$ and $AsH_3$.

SUMMARY

In view of a technical problem in the prior art that there is no catalyst for simultaneously removing $PH_3$ and $AsH_3$, the present invention provides a preparation method of a catalyst with white carbon black modified by Zr—Nd—O and use thereof. The present invention uses an organic solvent evaporation induced self-assembly method to load Zr—Nd—O onto white carbon black to obtain a Zr—Nd—O/white carbon black catalyst. The Zr—Nd—O/white carbon black catalyst in the present invention has high catalytic activity, contains uniformly distributed mesopores with a relatively large average aperture, and has a simple preparation process, etc.

A preparation method of a catalyst with white carbon black modified by Zr—Nd—O is provided, including the following specific steps:

(1) adding sodium chloride and ethanol to sodium silicate, uniformly mixing, and slowly adding water under stirring until sodium silicate colloidal particles are dissolved, to obtain an ethanol-sodium silicate solution mixture;

(2) adding sulfuric acid to the ethanol-sodium silicate solution mixture in step (1) at 25-45° C. under stirring to adjust a pH value of the system to 7.5-9.5; and conducting aging at 70-110° C. for 10-20 h to obtain white carbon black;

(3) adding the white carbon black in step (2) to ethanol under stirring, adding zirconium nitrate, neodymium nitrate, and a surfactant, and conducting reaction for 5-10 h to obtain a mixed white carbon black solution;

(4) evaporating ethanol from the mixed white carbon black solution in step (3) at 50-70° C. to obtain a precursor; and (5) calcining the precursor in step (4) at 300-500° for 2-4 h to obtain a mesoporous Zr—Nd—O/white carbon black catalyst.

A solid-to-liquid ratio g:mL of the sodium chloride to the sodium silicate in step (1) is 1:(10-15), and a volume ratio of the ethanol to the sodium silicate is 1:(0.8-1.2).

The surfactant in step (3) is a triblock copolymer P123, F127, or F108.

In step (3), a mass ratio of the zirconium nitrate to the white carbon black is 1:(1-2); a mass ratio of the neodymium nitrate to the white carbon black is 1:(3.3-6.7); and a mass ratio of the surfactant to the white carbon black is 1:(1-2).

The present invention provides use of a mesoporous Zr—Nd—O/white carbon black catalyst prepared by using the preparation method of a catalyst with white carbon black modified by Zr—Nd—O in simultaneously removing $PH_3$ and $AsH_3$ through catalysis.

According to the use of the preparation method in the present invention, the surfactant is removed though calcination, so that the catalyst has a mesoporous structure.

Beneficial effects of the present invention are as follows:

(1) In the present invention, an organic solvent evaporation induced self-assembly method is used to load Zr—Nd—O onto white carbon black to obtain a Zr—Nd—O/white carbon black catalyst. The Zr—Nd—O/white carbon black catalyst in the present invention has high catalytic activity, contains uniformly distributed mesopores with a relatively large average aperture, and has a simple preparation process, etc.

(2) In the present invention, Zr—Nd—O/white carbon black catalysts with different mesopore sizes can be obtained by using different surfactants.

DETAILED DESCRIPTION

The present invention will be further described in details below with reference to specific implementations, but the protection scope of the present invention is not limited thereto.

Embodiment 1: a preparation method of a catalyst with white carbon black modified by Zr—Nd—O is provided, including the following specific steps:

(1) adding sodium chloride and ethanol to sodium silicate, uniformly mixing, and slowly adding water under stirring until sodium silicate colloidal particles are dissolved, to obtain an ethanol-sodium silicate solution mixture, where a solid-to-liquid ratio g:mL of the sodium chloride to the sodium silicate is 1:10, and a volume ratio of the ethanol to the sodium silicate is 1:0.8;

(2) adding sulfuric acid to the ethanol-sodium silicate solution mixture in step (1) at 40° C. under stirring to adjust a pH value of the system to 8.0; and conducting aging at 90° C. for 15 h to obtain white carbon black;

(3) adding the white carbon black in step (2) to ethanol under stirring, adding zirconium nitrate, neodymium nitrate, and a surfactant (P123), and conducting reaction for 8 h to obtain a mixed white carbon black solution, where a mass ratio of the zirconium nitrate to the white carbon black is 1:1; a mass ratio of the neodymium nitrate to the white carbon black is 1:3.3; and a mass ratio of the surfactant (P123) to the white carbon black is 1:1;

(4) evaporating ethanol from the mixed white carbon black solution in step (3) at 65° C. to obtain a precursor; and (5) calcining the precursor in step (4) at 450° for 2.5 h to obtain a mesoporous Zr—Nd—O/white carbon black catalyst.

Figure 1:
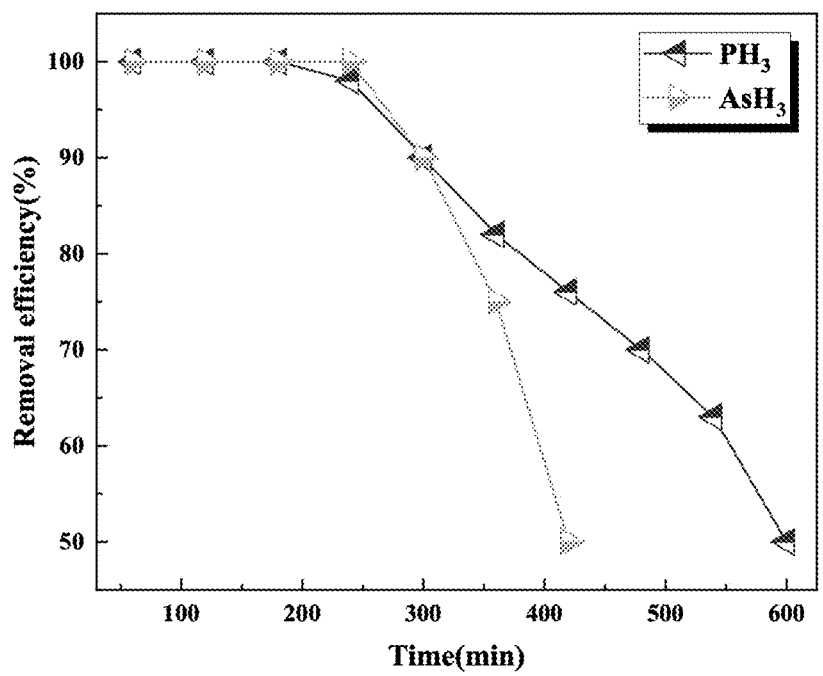
FIG. 1 is an effect diagram of simultaneously removing $PH_3$ and $AsH_3$ by using a mesoporous Zr—Nd—O/white carbon black catalyst according to Embodiment 1.

The catalytic performance test of the mesoporous Zr—Nd—O/white carbon black catalyst in this embodiment is conducted in a 16 mm×10 cm quartz fixed bed reactor. Reaction conditions are as follows: An initial concentration of $PH_3$ is 200 ppm, an initial concentration of $AsH_3$ is 100 ppm, equilibrium gas is $C_2H_2$, a space velocity is 15000 and the reaction temperature is 70° C. A test result is shown in FIG. 1. It can be seen from FIG. 1 that the catalyst has a better removal effect on $AsH_3$ than $PH_3$ in a removal stage corresponding to the removal efficiency 100%. However, as removal time increases, the catalyst has a better removal effect on $PH_3$ than $AsH_3$.

Embodiment 2: a preparation method of a catalyst with white carbon black modified by Zr—Nd—O is provided, including the following specific steps:

(1) adding sodium chloride and ethanol to sodium silicate, uniformly mixing, and slowly adding water under stirring until sodium silicate colloidal particles are dissolved, to obtain an ethanol-sodium silicate solution mixture, where a solid-to-liquid ratio g:mL of the sodium chloride to the sodium silicate is 1:12.5, and a volume ratio of the ethanol to the sodium silicate is 1:1;

(2) adding sulfuric acid to the ethanol-sodium silicate solution mixture in step (1) at 40° C. under stirring to adjust a pH value of the system to 8.0; and conducting aging at 90° C. for 15 h to obtain white carbon black;

(3) adding the white carbon black in step (2) to ethanol under stirring, adding zirconium nitrate, neodymium nitrate, and a surfactant (P123), and conducting reaction for 8 h to obtain a mixed white carbon black solution, where a mass ratio of the zirconium nitrate to the white carbon black is 1:1.5; a mass ratio of the neodymium nitrate to the white carbon black is 1:5; and a mass ratio of the surfactant (P123) to the white carbon black is 1:1.5;

(4) evaporating ethanol from the mixed white carbon black solution in step (3) at 65° C. to obtain a precursor; and (5) calcining the precursor in step (4) at 450° for 2.5 h to obtain a mesoporous Zr—Nd—O/white carbon black catalyst.

Figure 2:
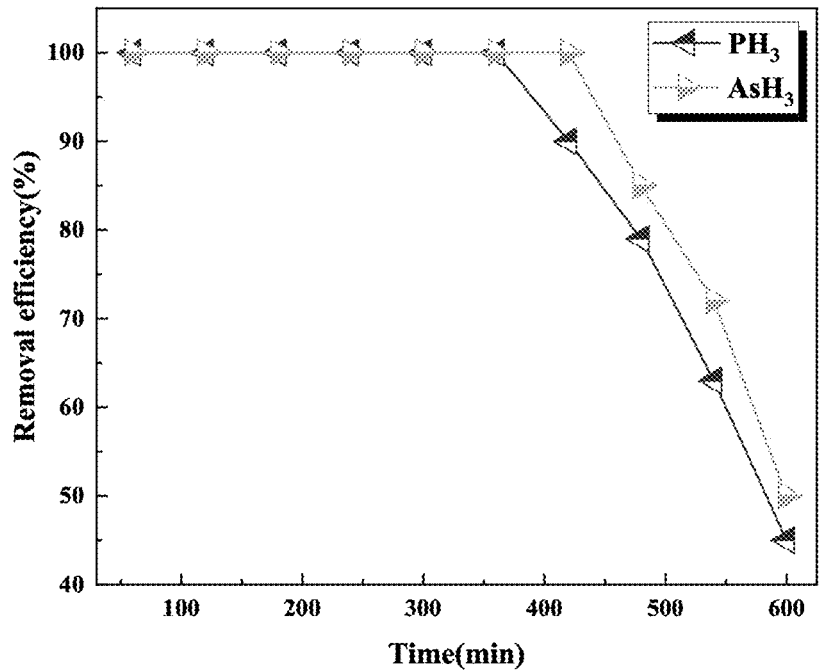
FIG. 2 is an effect diagram of simultaneously removing $PH_3$ and $AsH_3$ by using a mesoporous Zr—Nd—O/white carbon black catalyst according to Embodiment 2.

The catalytic performance test of the mesoporous Zr—Nd—O/white carbon black catalyst in this embodiment is conducted in a 16 mm×10 cm quartz fixed bed reactor. Reaction conditions are as follows: An initial concentration of $PH_3$ is 200 ppm, an initial concentration of $AsH_3$ is 100 ppm, equilibrium gas is $C_2H_2$, a space velocity is 15000 and the reaction temperature is 70° C. A test result is shown in FIG. 2. It can be seen from FIG. 2 that the $AsH_3$ removal efficiency 100% of the catalyst can be maintained for 420 min, and the catalyst has a better removal effect on $AsH_3$ than $PH_3$ in the whole removal process.

Embodiment 3: a preparation method of a catalyst with white carbon black modified by Zr—Nd—O is provided, including the following specific steps:

(1) adding sodium chloride and ethanol to sodium silicate, uniformly mixing, and slowly adding water under stirring until sodium silicate colloidal particles are dissolved, to obtain an ethanol-sodium silicate solution mixture, where a solid-to-liquid ratio g:mL of the sodium chloride to the sodium silicate is 1:15, and a volume ratio of the ethanol to the sodium silicate is 1:1.2;

(2) adding sulfuric acid to the ethanol-sodium silicate solution mixture in step (1) at 40° C. under stirring to adjust a pH value of the system to 8.0; and conducting aging at 90° C. for 15 h to obtain white carbon black;

(3) adding the white carbon black in step (2) to ethanol under stirring, adding zirconium nitrate, neodymium nitrate, and a surfactant (P123), and conducting reaction for 8 h to obtain a mixed white carbon black solution, where a mass ratio of the zirconium nitrate to the white carbon black is 1:2; a mass ratio of the neodymium nitrate to the white carbon black is 1:6.7; and a mass ratio of the surfactant (P123) to the white carbon black is 1:2;

(4) evaporating ethanol from the mixed white carbon black solution in step (3) at 65° C. to obtain a precursor; and (5) calcining the precursor in step (4) at 450° C. for 2.5 h to obtain a mesoporous Zr—Nd—O/white carbon black catalyst.

Figure 3:
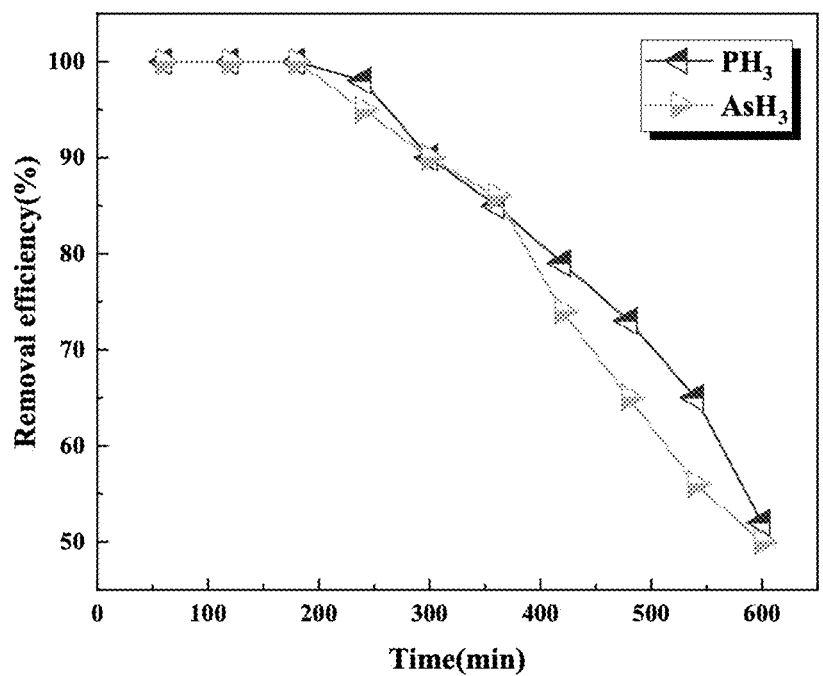
FIG. 3 is an effect diagram of simultaneously removing $PH_3$ and $AsH_3$ by using a mesoporous Zr—Nd—O/white carbon black catalyst according to Embodiment 3.

The catalytic performance test of the mesoporous Zr—Nd—O/white carbon black catalyst in this embodiment is conducted in a 16 mm×10 cm quartz fixed bed reactor. Reaction conditions are as follows: An initial concentration of $PH_3$ is 200 ppm, an initial concentration of $AsH_3$ is 100 ppm, equilibrium gas is $C_2H_2$, a space velocity is 15000 and the reaction temperature is 70° C. A test result is shown in FIG. 3. It can be seen from FIG. 3 that the catalyst has a relatively good removal effect on both $AsH_3$ and $PH_3$.

Embodiment 4: a preparation method of a catalyst with white carbon black modified by Zr—Nd—O is provided, including the following specific steps:

(1) adding sodium chloride and ethanol to sodium silicate, uniformly mixing, and slowly adding water under stirring until sodium silicate colloidal particles are dissolved, to obtain an ethanol-sodium silicate solution mixture, where a solid-to-liquid ratio g:mL of the sodium chloride to the sodium silicate is 1:10, and a volume ratio of the ethanol to the sodium silicate is 1:0.8;

(2) adding sulfuric acid to the ethanol-sodium silicate solution mixture in step (1) at 40° C. under stirring to adjust a pH value of the system to 8.0; and conducting aging at 90° C. for 15 h to obtain white carbon black;

(3) adding the white carbon black in step (2) to ethanol under stirring, adding zirconium nitrate, neodymium nitrate, and a surfactant (F127), and conducting reaction for 8 h to obtain a mixed white carbon black solution, where a mass ratio of the zirconium nitrate to the white carbon black is 1:1; a mass ratio of the neodymium nitrate to the white carbon black is 1:3.3; and a mass ratio of the surfactant (F127) to the white carbon black is 1:1;

(4) evaporating ethanol from the mixed white carbon black solution in step (3) at 65° C. to obtain a precursor; and (5) calcining the precursor in step (4) at 450° for 2.5 h to obtain a mesoporous Zr—Nd—O/white carbon black catalyst.

Figure 4:
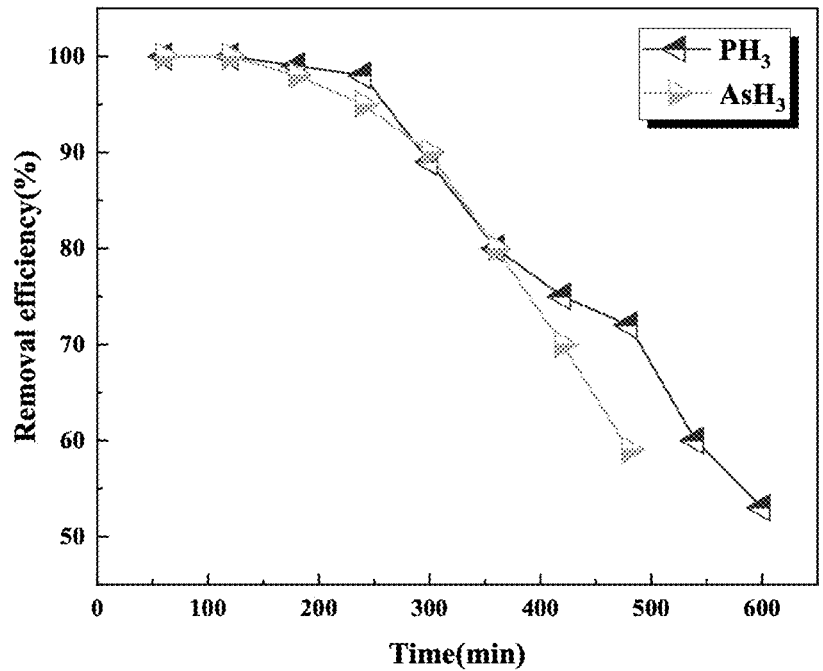
FIG. 4 is an effect diagram of simultaneously removing $PH_3$ and $AsH_3$ by using a mesoporous Zr—Nd—O/white carbon black catalyst according to Embodiment 4.

The catalytic performance test of the mesoporous Zr—Nd—O/white carbon black catalyst in this embodiment is conducted in a Φ6 mm×10 cm quartz fixed bed reactor. Reaction conditions are as follows: An initial concentration of $PH_3$ is 200 ppm, an initial concentration of $AsH_3$ is 100 ppm, equilibrium gas is $C_2H_2$, a space velocity is 15000 and the reaction temperature is 70° C. A test result is shown in FIG. 4. It can be seen from FIG. 4 that a $PH_3$ removal effect and an $AsH_3$ removal effect of the catalyst are basically consistent during a removal time of 360 min; and the catalyst has higher $PH_3$ removal efficiency than the $AsH_3$ removal efficiency after the removal time of 360 min.

Embodiment 5: a preparation method of a catalyst with white carbon black modified by Zr—Nd—O is provided, including the following specific steps:

(1) adding sodium chloride and ethanol to sodium silicate, uniformly mixing, and slowly adding water under stirring until sodium silicate colloidal particles are dissolved, to obtain an ethanol-sodium silicate solution mixture, where a solid-to-liquid ratio g:mL of the sodium chloride to the sodium silicate is 1:12.5, and a volume ratio of the ethanol to the sodium silicate is 1:1;

(2) adding sulfuric acid to the ethanol-sodium silicate solution mixture in step (1) at 40° C. under stirring to adjust a pH value of the system to 8.0; and conducting aging at 90° C. for 15 h to obtain white carbon black;

(3) adding the white carbon black in step (2) to ethanol under stirring, adding zirconium nitrate, neodymium nitrate, and a surfactant (F127), and conducting reaction for 8 h to obtain a mixed white carbon black solution, where a mass ratio of the zirconium nitrate to the white carbon black is 1:1.5; a mass ratio of the neodymium nitrate to the white carbon black is 1:5; and a mass ratio of the surfactant (F127) to the white carbon black is 1:1.5;

(4) evaporating ethanol from the mixed white carbon black solution in step (3) at 65° C. to obtain a precursor; and (5) calcining the precursor in step (4) at 450° for 2.5 h to obtain a mesoporous Zr—Nd—O/white carbon black catalyst.

Figure 5:
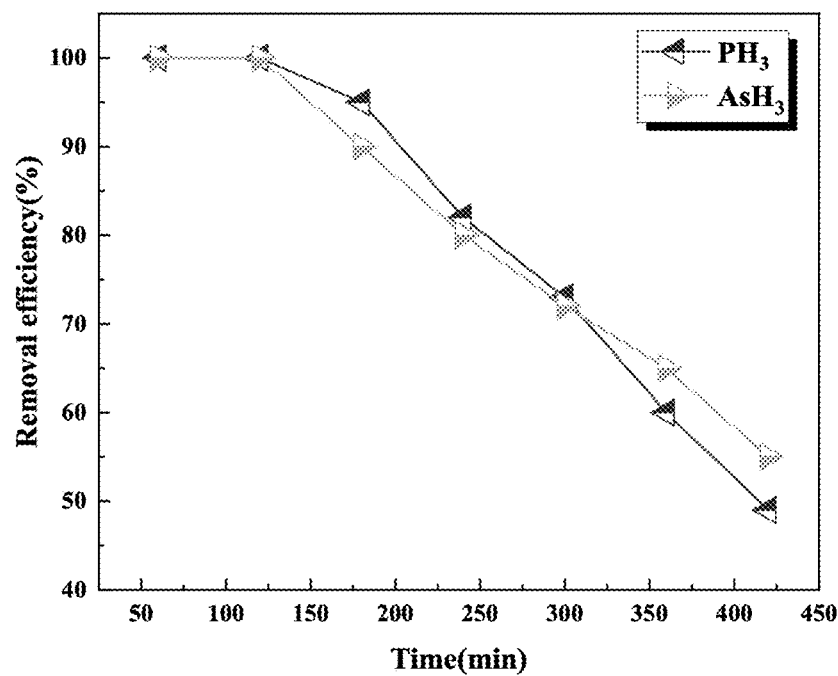
FIG. 5 is an effect diagram of simultaneously removing $PH_3$ and $AsH_3$ by using a mesoporous Zr—Nd—O/white carbon black catalyst according to Embodiment 5.
Figure 6:
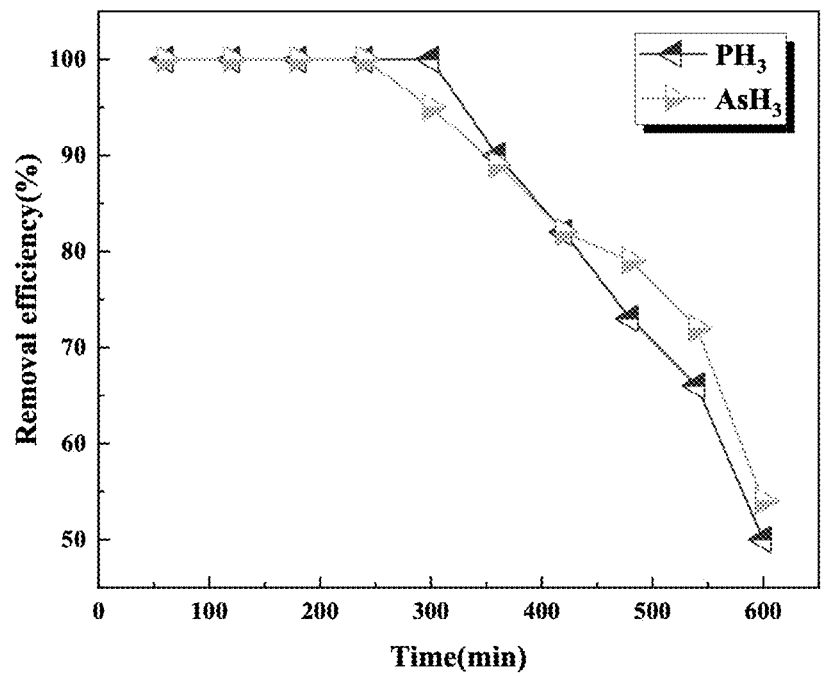
FIG. 6 is an effect diagram of simultaneously removing $PH_3$ and $AsH_3$ by using a mesoporous Zr—Nd—O/white carbon black catalyst according to Embodiment 6.

The catalytic performance test of the mesoporous Zr—Nd—O/white carbon black catalyst in this embodiment is conducted in a Φ6 mm×10 cm quartz fixed bed reactor. Reaction conditions are as follows: An initial concentration of $PH_3$ is 200 ppm, an initial concentration of $AsH_3$ is 100 ppm, equilibrium gas is $C_2H_2$, a space velocity is 15000 and the reaction temperature is 70° C. A test result is shown in FIG. 5. It can be seen from FIG. 5 that the catalyst has a better removal effect on $PH_3$ than $AsH_3$ during a removal time of 300 min; and the $PH_3$ removal efficiency and the $AsH_3$ removal efficiency of the catalyst are basically consistent after 300 min.

Embodiment 6: a preparation method of a catalyst with white carbon black modified by Zr—Nd—O is provided, including the following specific steps:

(1) adding sodium chloride and ethanol to sodium silicate, uniformly mixing, and slowly adding water under stirring until sodium silicate colloidal particles are dissolved, to obtain an ethanol-sodium silicate solution mixture, where a solid-to-liquid ratio g:mL of the sodium chloride to the sodium silicate is 1:15, and a volume ratio of the ethanol to the sodium silicate is 1:1.2;

(2) adding sulfuric acid to the ethanol-sodium silicate solution mixture in step (1) at 40° C. under stirring to adjust a pH value of the system to 8.0; and conducting aging at 90° C. for 15 h to obtain white carbon black;

(3) adding the white carbon black in step (2) to ethanol under stirring, adding zirconium nitrate, neodymium nitrate, and a surfactant (F127), and conducting reaction for 8 h to obtain a mixed white carbon black solution, where a mass ratio of the zirconium nitrate to the white carbon black is 1:2; a mass ratio of the neodymium nitrate to the white carbon black is 1:6.7; and a mass ratio of the surfactant (F127) to the white carbon black is 1:2;

(4) evaporating ethanol from the mixed white carbon black solution in step (3) at 65° C. to obtain a precursor; and (5) calcining the precursor in step (4) at 450° for 2.5 h to obtain a mesoporous Zr—Nd—O/white carbon black catalyst.

Figure 7:
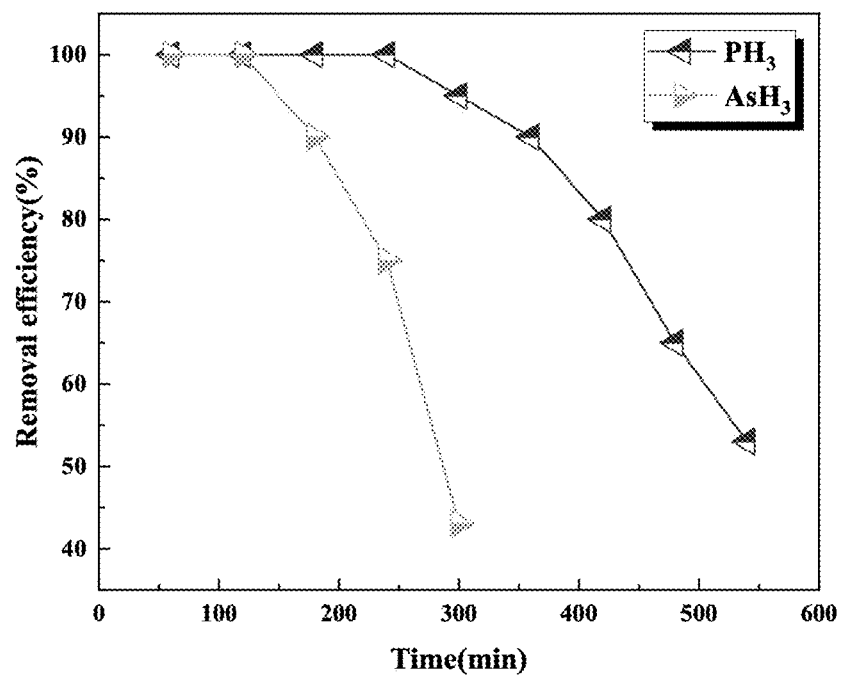
FIG. 7 is an effect diagram of simultaneously removing $PH_3$ and $AsH_3$ by using a mesoporous Zr—Nd—O/white carbon black catalyst according to Embodiment 7.

The catalytic performance test of the mesoporous Zr—Nd—O/white carbon black catalyst in this embodiment is conducted in a 16 mm× 10 cm quartz fixed bed reactor. Reaction conditions are as follows: An initial concentration of $PH_3$ is 200 ppm, an initial concentration of $AsH_3$ is 100 ppm, equilibrium gas is $C_2H_2$, a space velocity is 15000 $h^{-1}$, and the reaction temperature is 70° C. A test result is shown in FIG. 7. It can be seen from FIG. 7 that, the $PH_3$ removal efficiency of the catalyst is 100% before 250 min, and the whole $AsH_3$ removal efficiency of the catalyst is obviously higher than its $PH_3$ removal efficiency.

Embodiment 7: a preparation method of a catalyst with white carbon black modified by Zr—Nd—O is provided, including the following specific steps:

(1) adding sodium chloride and ethanol to sodium silicate, uniformly mixing, and slowly adding water under stirring until sodium silicate colloidal particles are dissolved, to obtain an ethanol-sodium silicate solution mixture, where a solid-to-liquid ratio g:mL of the sodium chloride to the sodium silicate is 1:10, and a volume ratio of the ethanol to the sodium silicate is 1:0.8;

(2) adding sulfuric acid to the ethanol-sodium silicate solution mixture in step (1) at 40° C. under stirring to adjust a pH value of the system to 8.0; and conducting aging at 90° C. for 15 h to obtain white carbon black;

(3) adding the white carbon black in step (2) to ethanol under stirring, adding zirconium nitrate, neodymium nitrate, and a surfactant (F108), and conducting reaction for 8 h to obtain a mixed white carbon black solution, where a mass ratio of the zirconium nitrate to the white carbon black is 1:1; a mass ratio of the neodymium nitrate to the white carbon black is 1:3.3; and a mass ratio of the surfactant (F108) to the white carbon black is 1:1;

(4) evaporating ethanol from the mixed white carbon black solution in step (3) at 65° C. to obtain a precursor; and (5) calcining the precursor in step (4) at 450° for 2.5 h to obtain a mesoporous Zr—Nd—O/white carbon black catalyst.

The catalytic performance test of the mesoporous Zr—Nd—O/white carbon black catalyst in this embodiment is conducted in a 16 mm×10 cm quartz fixed bed reactor. Reaction conditions are as follows: An initial concentration of $PH_3$ is 200 ppm, an initial concentration of $AsH_3$ is 100 ppm, equilibrium gas is $C_2H_2$, a space velocity is 15000 and the reaction temperature is 70° C. A test result is shown in FIG. 7. It can be seen from FIG. 7 that, the $PH_3$ removal efficiency of the catalyst is 100% before 250 min, and the whole $PH_3$ removal efficiency of the catalyst is obviously higher than its $PH_3$ removal efficiency.

Embodiment 8: a preparation method of a catalyst with white carbon black modified by Zr—Nd—O is provided, including the following specific steps:

(1) adding sodium chloride and ethanol to sodium silicate, uniformly mixing, and slowly adding water under stirring until sodium silicate colloidal particles are dissolved, to obtain an ethanol-sodium silicate solution mixture, where a solid-to-liquid ratio g:mL of the sodium chloride to the sodium silicate is 1:12.5, and a volume ratio of the ethanol to the sodium silicate is 1:1;

(2) adding sulfuric acid to the ethanol-sodium silicate solution mixture in step (1) at 40° C. under stirring to adjust a pH value of the system to 8.0; and conducting aging at 90° C. for 15 h to obtain white carbon black;

(3) adding the white carbon black in step (2) to ethanol under stirring, adding zirconium nitrate, neodymium nitrate, and a surfactant (F108), and conducting reaction for 8 h to obtain a mixed white carbon black solution, where a mass ratio of the zirconium nitrate to the white carbon black is 1:1.5; a mass ratio of the neodymium nitrate to the white carbon black is 1:5; and a mass ratio of the surfactant (F108) to the white carbon black is 1:1.5;

(4) evaporating ethanol from the mixed white carbon black solution in step (3) at 65° C. to obtain a precursor; and (5) calcining the precursor in step (4) at 450° for 2.5 h to obtain a mesoporous Zr—Nd—O/white carbon black catalyst.

Figure 8:
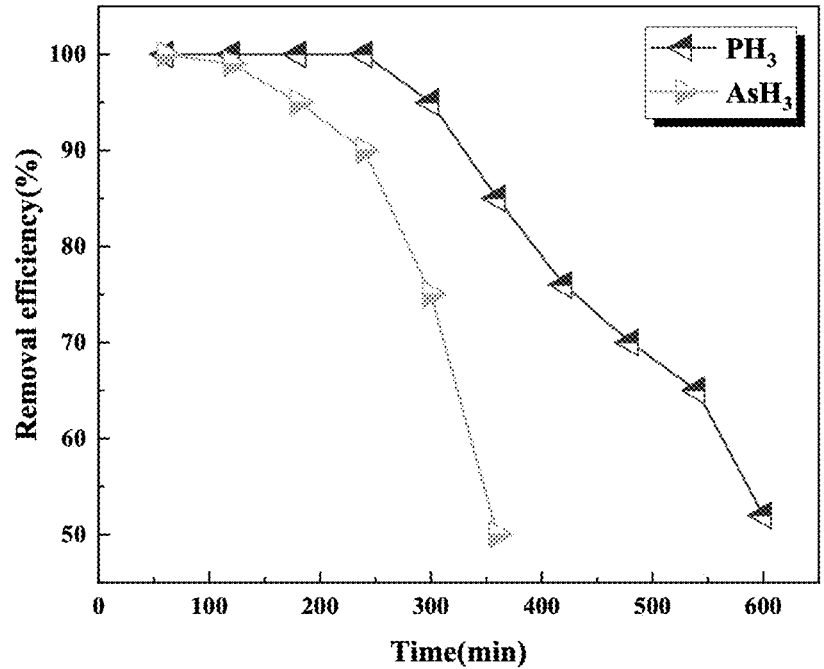
FIG. 8 is an effect diagram of simultaneously removing $PH_3$ and $AsH_3$ by using a mesoporous Zr—Nd—O/white carbon black catalyst according to Embodiment 8.

The catalytic performance test of the mesoporous Zr—Nd—O/white carbon black catalyst in this embodiment is conducted in a 16 mm×10 cm quartz fixed bed reactor. Reaction conditions are as follows: An initial concentration of $PH_3$ is 200 ppm, an initial concentration of $AsH_3$ is 100 ppm, equilibrium gas is $C_2H_2$, a space velocity is 15000 and the reaction temperature is 70° C. A test result is shown in FIG. 8. It can be seen from FIG. 8 that, the $AsH_3$ removal efficiency of the catalyst is 100% before 150 min, and the whole $AsH_3$ removal efficiency of the catalyst is obviously lower than its $PH_3$ removal efficiency.

Embodiment 9: a preparation method of a catalyst with white carbon black modified by Zr—Nd—O is provided, including the following specific steps:

(1) adding sodium chloride and ethanol to sodium silicate, uniformly mixing, and slowly adding water under stirring until sodium silicate colloidal particles are dissolved, to obtain an ethanol-sodium silicate solution mixture, where a solid-to-liquid ratio g:mL of the sodium chloride to the sodium silicate is 1:15, and a volume ratio of the ethanol to the sodium silicate is 1:1.2;

(2) adding sulfuric acid to the ethanol-sodium silicate solution mixture in step (1) at 40° C. under stirring to adjust a pH value of the system to 8.0; and conducting aging at 90° C. for 15 h to obtain white carbon black;

(3) adding the white carbon black in step (2) to ethanol under stirring, adding zirconium nitrate, neodymium nitrate, and a surfactant (F108), and conducting reaction for 8 h to obtain a mixed white carbon black solution, where a mass ratio of the zirconium nitrate to the white carbon black is 1:2; a mass ratio of the neodymium nitrate to the white carbon black is 1:6.7; and a mass ratio of the surfactant (F108) to the white carbon black is 1:2;

(4) evaporating ethanol from the mixed white carbon black solution in step (3) at 65° C. to obtain a precursor; and (5) calcining the precursor in step (4) at 450° for 2.5 h to obtain a mesoporous Zr—Nd—O/white carbon black catalyst.

Figure 9:
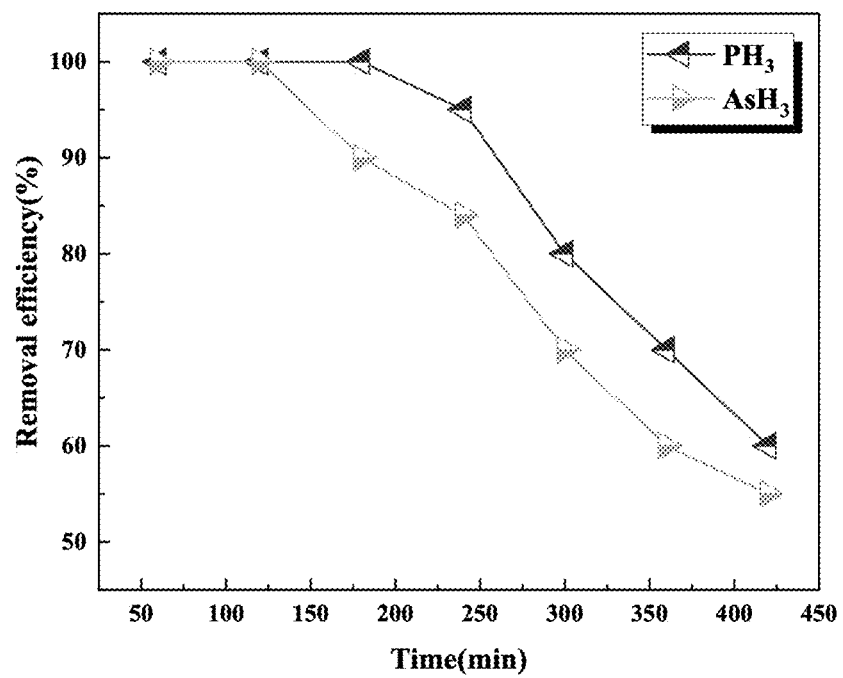
FIG. 9 is an effect diagram of simultaneously removing $PH_3$ and $AsH_3$ by using a mesoporous Zr—Nd—O/white carbon black catalyst according to Embodiment 9.

The catalytic performance test of the mesoporous Zr—Nd—O/white carbon black catalyst in this embodiment is conducted in a 16 mm×10 cm quartz fixed bed reactor. Reaction conditions are as follows: An initial concentration of $PH_3$ is 200 ppm, an initial concentration of $AsH_3$ is 100 ppm, equilibrium gas is $C_2H_2$, a space velocity is 15000 $h^{-1}$, and the reaction temperature is 70° C. A test result is shown in FIG. 9. It can be seen from FIG. 3 that, after 200 min, the $AsH_3$ removal efficiency of the catalyst is still lower than its $PH_3$ removal efficiency, but the whole $AsH_3$ removal efficiency is obviously improved compared with that in Embodiment 8.

What is claimed is:

1. A preparation method of a catalyst with white carbon black modified by Zr—Nd—O, comprising the following specific steps:
   (1) adding sodium chloride and ethanol to sodium silicate, uniformly mixing, and slowly adding water under stirring until sodium silicate colloidal particles are dissolved, to obtain an ethanol-sodium silicate solution mixture;
   (2) adding sulfuric acid to the ethanol-sodium silicate solution mixture in step (1) at 25-45° C. under stirring to adjust a pH value of the system to 7.5-9.5; and conducting aging at 70-110° C. for 10-20 h to obtain white carbon black;
   (3) adding the white carbon black in step (2) to ethanol under stirring, adding zirconium nitrate, neodymium nitrate, and a surfactant, and conducting reaction for 5-10 h to obtain a mixed white carbon black solution;
   (4) evaporating ethanol from the mixed white carbon black solution in step (3) at 50-70° C. to obtain a precursor; and
   (5) calcining the precursor in step (4) at 300-500° C. for 2-4 h to obtain a mesoporous Zr—Nd—O/white carbon black catalyst.

2. The preparation method according to claim 1, wherein a ratio of the sodium chloride to the sodium silicate in step (1), i.e., a solid-to-liquid ratio, is 1 g:(10-15) mL, and a volume ratio of the ethanol to the sodium silicate is 1:(0.8-1.2).

3. The preparation method according to claim 1, wherein the surfactant in step (3) is a triblock copolymer P123, F127, or F108.

4. The preparation method according to claim 1, wherein in step (3), a mass ratio of the zirconium nitrate to the white carbon black is 1:(1-2); a mass ratio of the neodymium nitrate to the white carbon black is 1:(3.3-6.7); and a mass ratio of the surfactant to the white carbon black is 1:(1-2).

5. Use of a mesoporous Zr—Nd—O/white carbon black catalyst prepared by using the preparation method of a catalyst with white carbon black modified by Zr—Nd—O according to claim 1 in simultaneously removing $PH_3$ and $AsH_3$ through catalysis.

6. Use of a mesoporous Zr—Nd—O/white carbon black catalyst prepared by using the preparation method of a catalyst with white carbon black modified by Zr—Nd—O according to claim 2 in simultaneously removing $PH_3$ and $AsH_3$ through catalysis.

7. Use of a mesoporous Zr—Nd—O/white carbon black catalyst prepared by using the preparation method of a catalyst with white carbon black modified by Zr—Nd—O according to claim 3 in simultaneously removing $PH_3$ and $AsH_3$ through catalysis.

8. Use of a mesoporous Zr—Nd—O/white carbon black catalyst prepared by using the preparation method of a catalyst with white carbon black modified by Zr—Nd—O according to claim 4 in simultaneously removing $PH_3$ and $AsH_3$ through catalysis.

* * * * *